United States Patent
Chang et al.

(10) Patent No.: US 11,836,302 B2
(45) Date of Patent: Dec. 5, 2023

(54) MOTION COMPUTING SYSTEM AND METHOD FOR VIRTUAL REALITY

(71) Applicant: HTC Corporation, Taoyuan (TW)

(72) Inventors: Tzu-Yin Chang, Taoyuan (TW); SyuanYu Hsieh, Taoyuan (TW); Cheng-Han Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/169,181

(22) Filed: Feb. 14, 2023

(65) Prior Publication Data

US 2023/0280840 A1     Sep. 7, 2023

Related U.S. Application Data

(60) Provisional application No. 63/268,799, filed on Mar. 3, 2022.

(51) Int. Cl.
| | |
|---|---|
| G06F 3/0346 | (2013.01) |
| G06V 40/10 | (2022.01) |
| G06T 7/246 | (2017.01) |
| G06F 3/01 | (2006.01) |
| G06F 3/038 | (2013.01) |

(52) U.S. Cl.
CPC ............ G06F 3/0346 (2013.01); G06F 3/011 (2013.01); G06F 3/038 (2013.01); G06T 7/246 (2017.01); G06V 40/11 (2022.01); *G06F 2203/0331* (2013.01); *G06T 2207/30196* (2013.01)

(58) Field of Classification Search
CPC ......... G06F 3/0346; G06F 3/011; G06F 3/038
See application file for complete search history.

(56) References Cited

U.S. PATENT DOCUMENTS

| | | | |
|---|---|---|---|
| 2019/0227642 A1* | 7/2019 | Nishizawa | ............... G06F 3/014 |
| 2020/0133395 A1* | 4/2020 | Kaneko | ................. G06F 3/0346 |
| 2021/0089162 A1 | 3/2021 | Erivantcev et al. | |

FOREIGN PATENT DOCUMENTS

| | | |
|---|---|---|
| TW | 201329853 A1 | 7/2013 |
| TW | 201842431 A | 12/2018 |

OTHER PUBLICATIONS

The office action of the corresponding Taiwanese application No. TW112107780 dated Aug. 18, 2023.

(Continued)

*Primary Examiner* — Kevin M Nguyen
(74) *Attorney, Agent, or Firm* — CKC & Partners Co., LLC

(57) ABSTRACT

A motion computing system for virtual reality is provided, which comprises a wearable device and a head-mounted display. The head-mounted display performs following steps for: setting a wearing position of the wearable device; determining whether to generate a hand model having finger skeleton data for the hand of the user is found in a monitored field by a hand tracking algorithm; in response respond to that determine the hand model is found in the monitored field, identifying a device position according to the wearing position and the finger skeleton data, and identifying a device rotation of the wearable device in the monitored field according to the inertial data; calculating a pointer direction in the monitored field according to the device position and the device rotation; and generating a ray in a virtual reality field according to the pointer direction and the device position.

20 Claims, 10 Drawing Sheets

(56) References Cited

OTHER PUBLICATIONS

Pietroszek Krzysztof: "Raycasting in Virtual Reality", In: "Encyclopedia of Computer Graphics and Games", Jan. 1, 2018 (Jan. 1, 2018), Springer International Publishing, Cham, XP093058163, ISBN:978-3-319-08234-9, pp. 1-3, DOI:10.1007/978-3-319-08234-9_180-1, Retrieved from the Internet:URL:https://link.springer.com/content/pdf/10.1007/978-3-319-08234-9_180-1.
The European extended search report of the corresponding European application No. 23158867.4 dated Jul. 6, 2023.
The European Office Action of the corresponding European application No. 23158867.4 dated Jul. 18, 2023.

* cited by examiner

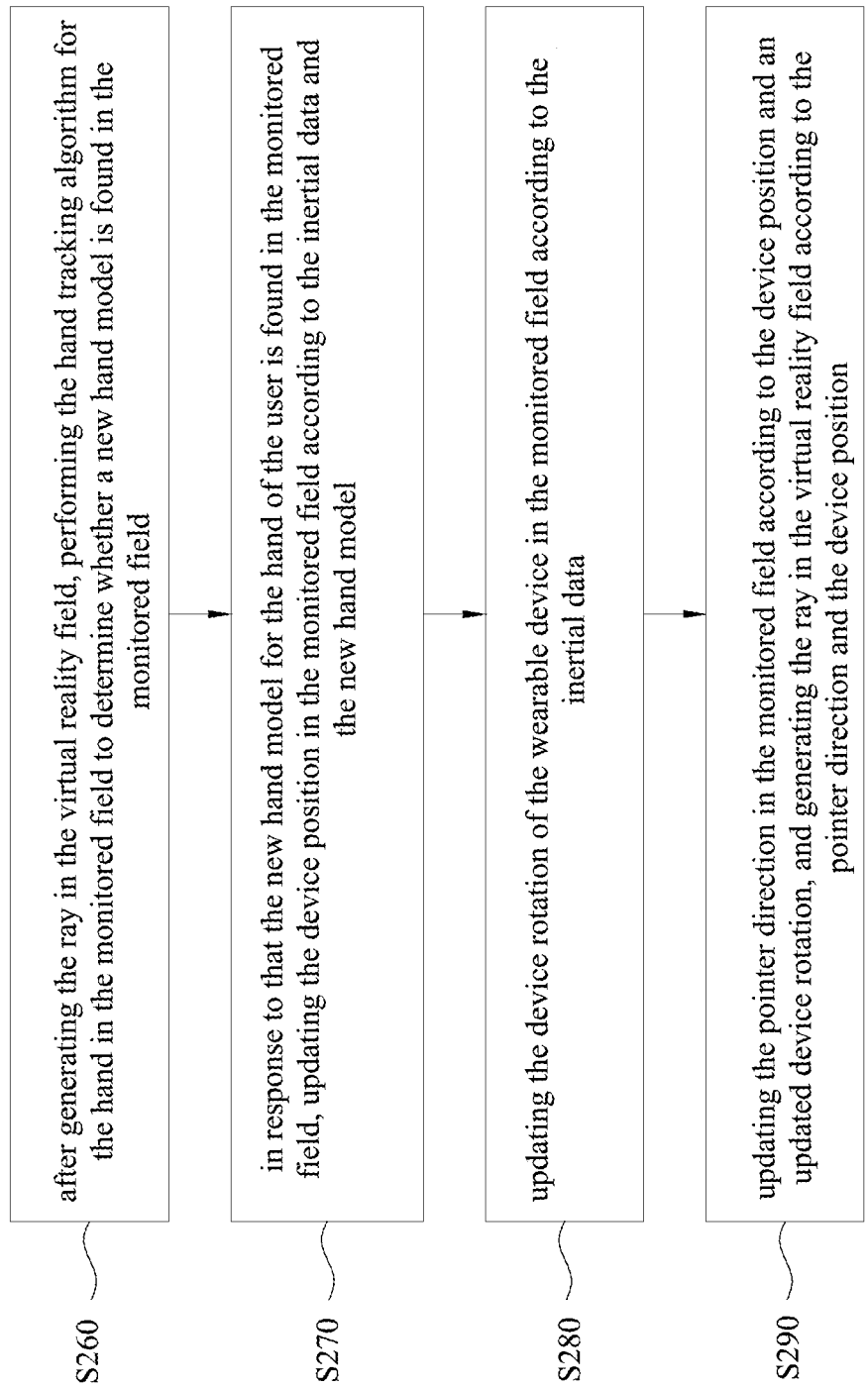

MOTION COMPUTING SYSTEM AND METHOD FOR VIRTUAL REALITY

CROSS-REFERENCE TO RELATED APPLICATION

This application claims priority to U.S. Provisional Application Ser. No. 63/268,799, filed Mar. 3, 2022, which is herein incorporated by reference in its entirety.

BACKGROUND

Field of Disclosure

The present disclosure relates to a mixed reality technology. More particularly, the present disclosure relates to a motion computing system and method for mixed reality.

Description of Related Art

In order to provide intuitive operations on electronic devices (e.g., game consoles, computers, smart phones, smart appliances, etc.), user's motion can be detected to directly operate the electronic device according to the user's motion. In conventional approaches, technologies, such as virtual reality (VR), augmented reality (AR), mixed reality (MR) and extended reality (XR), etc., for simulating sensations, perceptions and/or environments are welcome. A controller, an inertial measurement unit and a head-mounted display are often used to detect interactive input data (e.g., input by pushing buttons on the controller), inertial data of hands of a user and a hand skeleton of the user respectively, so as to interact with a virtual reality field. However, the commonly used inertial measurement unit has the problem of drift error, the commonly used controller can't let the user hand-free and the commonly used head-mounted display has the problem of the dead zone error. Therefore, these create a bias in the interactive input.

SUMMARY

The disclosure provides a motion computing system for mixed reality, which comprised a wearable device and a head-mounted display. The wearable device comprises an inertial measurement unit, wherein the inertial measurement unit detects inertial data. The head-mounted display is coupled to the wearable device, wherein the head-mounted display is configured to perform following steps for: setting a wearing position of the wearable device, wherein the wearing position indicates a position where the wearable device is worn on a hand of a user; determining whether a hand model having finger skeleton data for the hand of the user is found in a monitored field by hand tracking algorithms; in response to that determine the hand model is found in the monitored field, identifying a device position of the wearable device according to the wearing position and the finger skeleton data, and identifying a device rotation of the wearable device in the monitored field according to the inertial data; calculating a pointer direction in the monitored field according to the device position and the device rotation; and generating a ray in a virtual reality field according to the pointer direction and the device position.

The disclosure provides a motion computing method for mixed reality, which comprises: detecting inertial data, and setting a wearing position of a wearable device, wherein the wearing position indicates a position where the wearable device is worn on a hand of a user; determining whether a hand model having finger skeleton data for the hand of the user is found in a monitored field by hand tracking algorithms; in respond to that determine the hand model in the monitored field, identifying a device position of the wearable device according to the wearing position and the finger skeleton data, and identifying a device rotation of the wearable device in the monitored field according to the inertial data; calculating a pointer direction in the monitored field according to the device position and the device rotation; and generating a ray in a virtual reality field according to the pointer direction and the device position.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2C is a flowchart of other further steps in the motion computing method for mixed reality according to an embodiment of the disclosure.

DETAILED DESCRIPTION

Figure 1:
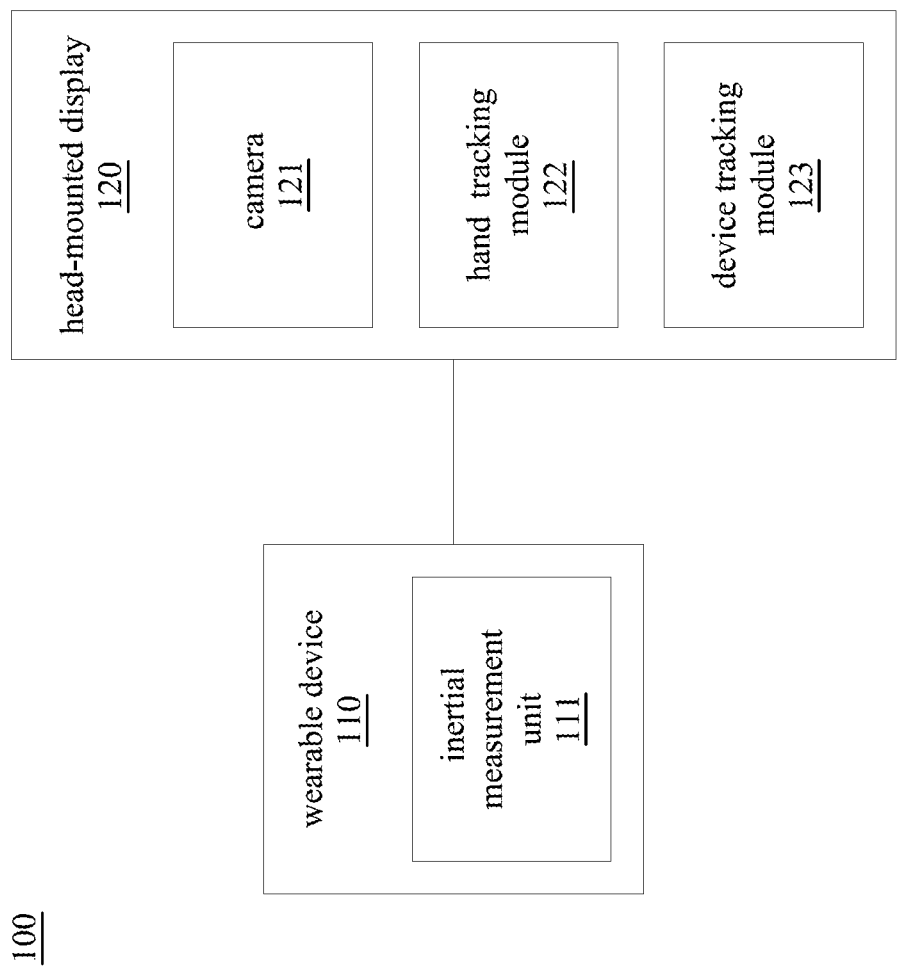
FIG. 1 is a block diagram of motion computing system for mixed reality of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a block diagram of motion computing system 100 for mixed reality (MR) of the present disclosure. The motion computing system 100 for mixed reality includes a wearable device 110 and a head-mounted display 120. The head-mounted display 120 is coupled with the wearable device 110.

In some embodiments, the wearable device 110 can be a handheld type device or a ring type device. In some embodiments, the wearable device 110 can include one or multiple clicked button for interactive input. In some embodiments, the wearable device 110 does not have any marking (e.g., a light-emitting diode or a specific pattern) for identification by any computer vision algorithm (e.g., convolutional neural network or you only look once (YOLO)).

Moreover, the wearable device 110 includes an inertial measurement unit (IMU) 111, where the inertial measurement unit 111 detects inertial data. In some embodiments, the inertial measurement unit 111 can be an electronic device that measures and reports a specific force of the wearable device 110, angular rate, acceleration, and sometimes the orientation of the wearable device 110, using a combination of accelerometers, gyroscopes, and sometimes magnetometers. In some embodiments, the inertial measurement unit 111 is used for sensing motion of a corresponding body part (e.g., a finger) of a user wearing the wearable device 110 at multiple detection time points of the inertial measurement unit 111, so as to generate the inertial data including a sequence of sensing data from sensing results (e.g., acceleration, angular rate or magnetism, etc.) of the inertial measurement unit 111 at the multiple detection time points of the inertial measurement unit 111.

In some embodiments, the inertial measurement unit 111 can be consists of a three-axis accelerometer and a three-axis gyroscope, and the three-axis accelerometer and the three-axis gyroscope can detect the acceleration and the angular rate, and the inertial measurement unit 111 can generate the inertial data which is sensing data of 6 degrees of freedom (6DoF) according to the acceleration and the angular rate.

In some embodiments, the head-mounted display 120 can be a virtual reality headset or other head-mounted device for mixed reality. In some embodiments, the head-mounted display 120 can display a virtual reality field and virtual objects in the virtual reality field. For example, the virtual reality field can be a virtual classroom, and the virtual objects can be virtual tables.

In some embodiments, the head-mounted display 120 can include a camera 121, a hand tracking module 122 and a device tracking module 123. In some embodiments, the camera 121 can be a camera for capturing images or a camera capable of taking pictures continuously to shoot a monitored field (e.g., a room of the user). In some embodiments, the hand tracking module 122 and the device tracking module 123 can be implemented by any software (e.g., Python), any hardware (e.g., a processor, a memory or a processing circuit) or a combination of thereof. For example, the hand tracking module 122 and the device tracking module 123 can be program modules stored in the memory of the head-mounted display 120, and the processor of the device tracking module 123 can perform the hand tracking module 122 and the device tracking module 123.

In some embodiments, the hand tracking module 122 can performing a hand tracking algorithm for an image captured by the camera 121 at multiple detection time points of the hand tracking module 122. In some embodiments, the device tracking module 123 can a device position and a device rotation of the wearable device 110 in the monitored field. The detailed steps of operating the hand tracking module 122 and the device tracking module 123 will be explained further below. In some embodiments, a detection frequency of the inertial data is more than a detection frequency of performing the hand tracking algorithm (i.e., a quantity of the detection time points of the inertial measurement unit 111 is more than a quantity of the detection time points of the hand tracking module 122).

In some embodiments, the device position can be a coordinate in a 3-axis space, and the device rotation can be 3 amounts of rotation along 3 rotation direction of 3 axes (e.g., an amount of rotation along a rotation direction of x axis in the 3-axis space).

Figure 2A:
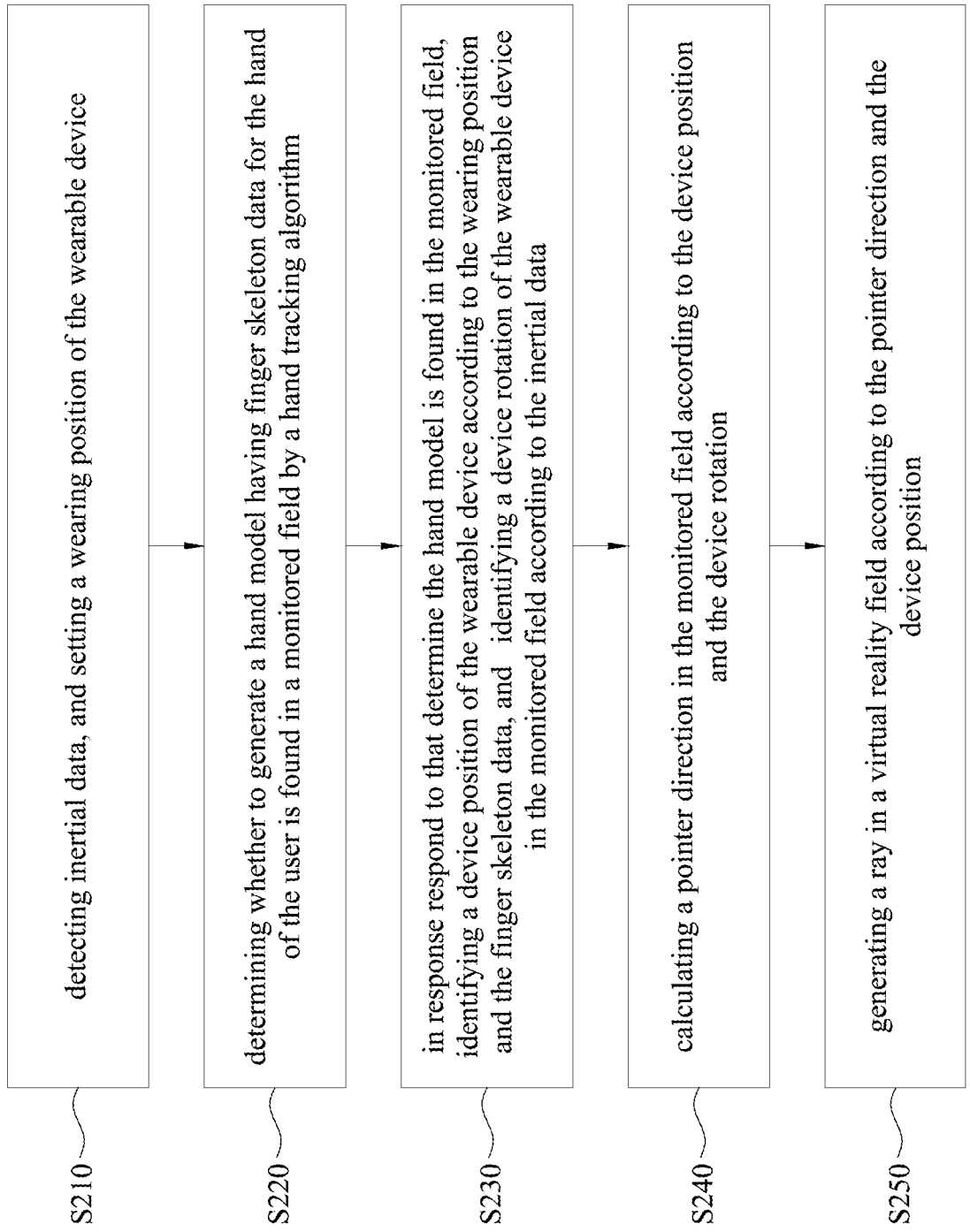
FIG. 2A is a flowchart of a motion computing method for mixed reality according to an embodiment of the disclosure.

Reference is further made to FIG. 2A, which is a flowchart of a motion computing method for mixed reality according to an embodiment of the disclosure. The motion computing system 100 shown in FIG. 1 can be utilized to perform the motion computing method shown in FIG. 2A.

As shown in FIG. 2A, firstly in step S210, the inertial data is detected, and a wearing position of the wearable device is set. In this embodiment, the wearable device 110 detects the inertial data, the head-mounted display 120 sets the wearing position of the wearable device, where the wearing position indicates a position where the wearable device 110 is worn on a hand of the user.

In some embodiments, the wearing position can be set by the user through the head-mounted display 120 according to the wearing scenario. In other embodiments, the wearing position can be identified and set by performing the computer vision algorithm. In some embodiments, the head-mounted display 120 can set the wearing position as one of knuckles of the hand. For example, the head-mounted display 120 sets the wearing position as a second knuckle of an index finger of the user when the user wants to select a virtual object by his index finger in the virtual reality field.

In step S220, whether a hand model having finger skeleton data for the hand of the user is found in a monitored field by a hand tracking algorithm is determined. In some embodiments, the hand tracking algorithm can be any computer vision algorithm for building the hand model in the virtual reality field. In some embodiments, the hand model can be a virtual hand skeleton having finger skeleton data for the hand of the user corresponding to the hand in the virtual reality field.

In some embodiments, the monitored field is shot to generating a recent field image, and whether multiple joint data indicating multiple joints of the hand is found is determined. Next, in response to that the multiple joint data is found, a hand model (i.e., a model of the hand skeleton having the finger skeleton data for the hand of the user) is generated according the multiple joint data.

Figure 3:
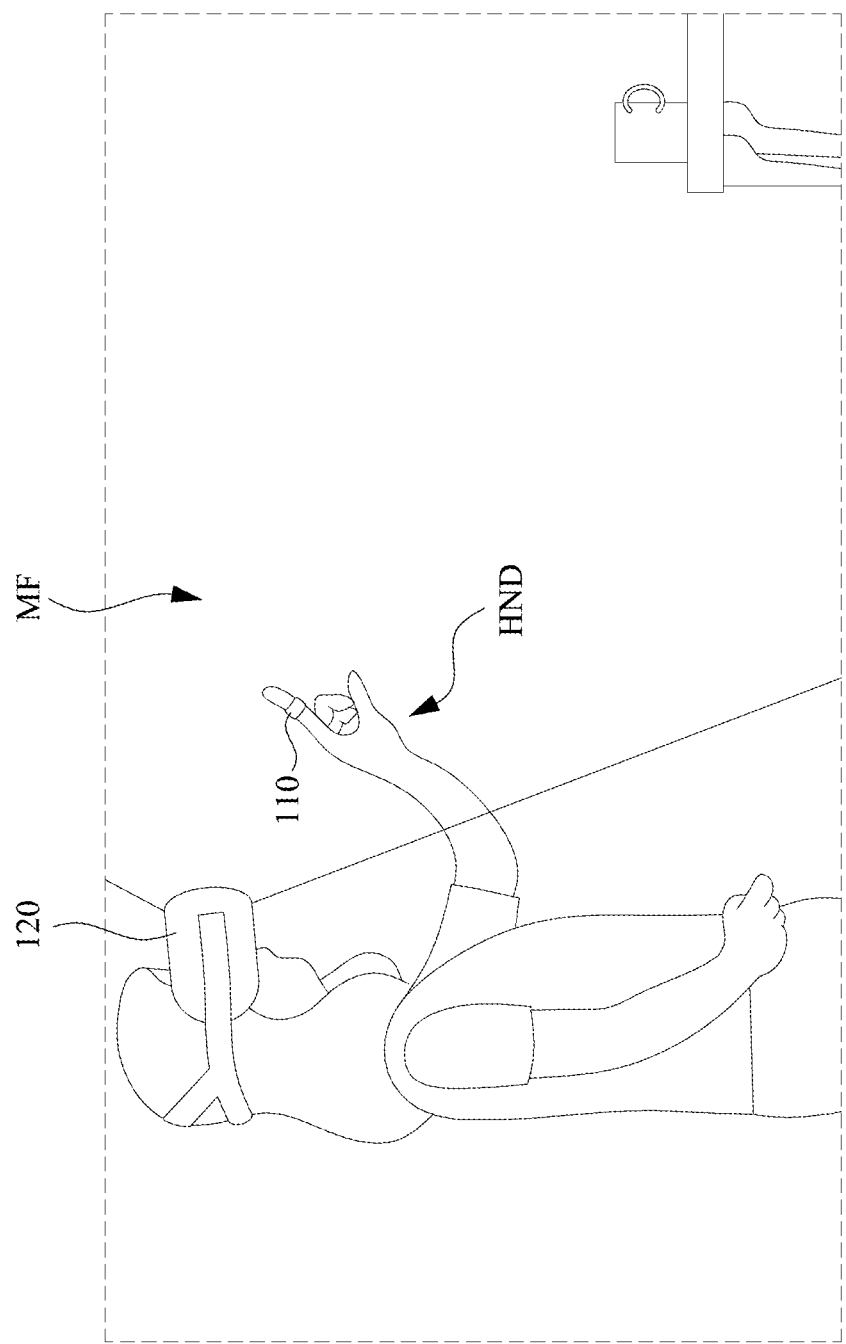
FIG. 3 is a schematic diagram illustrating shooting a monitored field according to an embodiment of the disclosure.

The following is a practical example to demonstrate shooting the monitored field. Reference is further made to FIG. 3, which is a schematic diagram illustrating shooting the monitored field MF according to an embodiment of the disclosure. As shown in FIG. 3, the head-mounted display 120 can shoot the monitored field MF which is a room in front of the user, and the user can wear the wearable device 110. If the hand of the user is in a shooting range of the head-mounted display 120, the head-mounted display 120 can shoot the hand to identify the multiple joint data indicating the multiple joints of the hand. Conversely, if the hand of the user is not in the shooting range of the head-mounted display 120 (i.e., the hand of the user is in a dead zone), the head-mounted display 120 cannot identify the multiple joint data indicating the multiple joints of the hand.

In some embodiments, an image recognition algorithm is performed for the recent field image to determine whether the hand exists in the monitored field. Next, in response to that the hand exists in the monitored field, the multiple joint data indicating the multiple joints of the hand is identified, and the hand model is generated according the multiple joint data.

Figure 4:
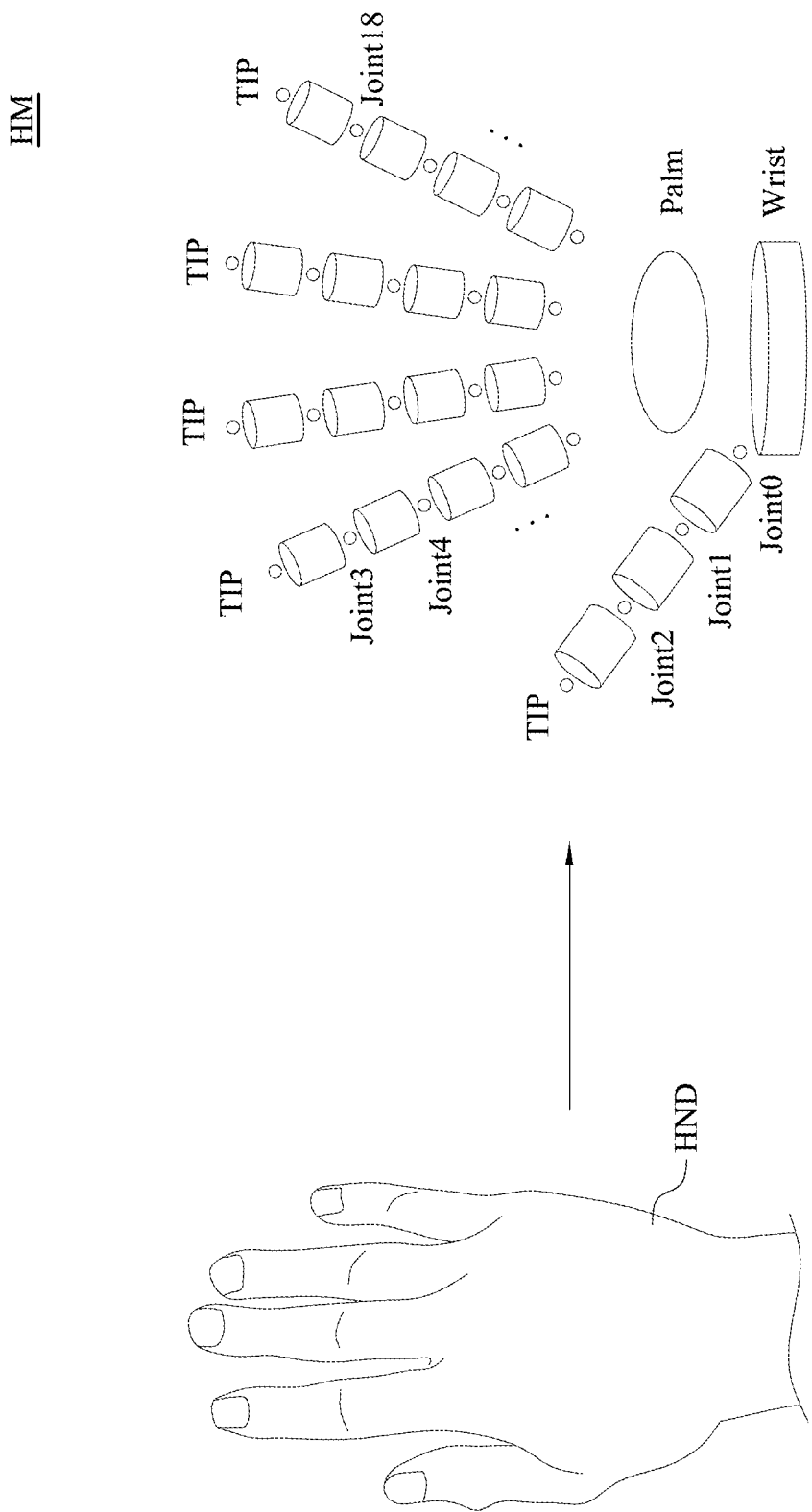
FIG. 4 is a schematic diagram illustrating generating a hand model according to an embodiment of the disclosure.

The following is a practical example to demonstrate generating the hand model. Reference is further made to FIG. 4, which is a schematic diagram illustrating generating the hand model HM according to an embodiment of the disclosure. As shown in FIG. 4, the hand model HM is generated from the hand HND. The hand model HM is a model of a hand skeleton having the finger skeleton data for the hand of the user, and includes multiple tips, a palm, a wrist and multiple joints joint1 to joint18.

In some embodiments, the above-mentioned steps S210 to S220 are perform by the hand tracking module 122.

As shown in FIG. 2A, in step S230, in response to that the hand model is found in the monitored field, a device position of the wearable device in the monitored field is identified according to the wearing position and the finger skeleton data, and a device rotation of the wearable device in the monitored field is identified according to the inertial data. In some embodiments, coordinates of adjacent joints in a 3-axis space can be added and divided by 2 to generate a coordinate of the device position. In some embodiments, the device rotation can be identified by the angular rate at multiple detection time point of the inertial measurement unit 111.

In step S240, a pointer direction is calculated in the monitored field according to the device position and the device rotation.

Figure 5:
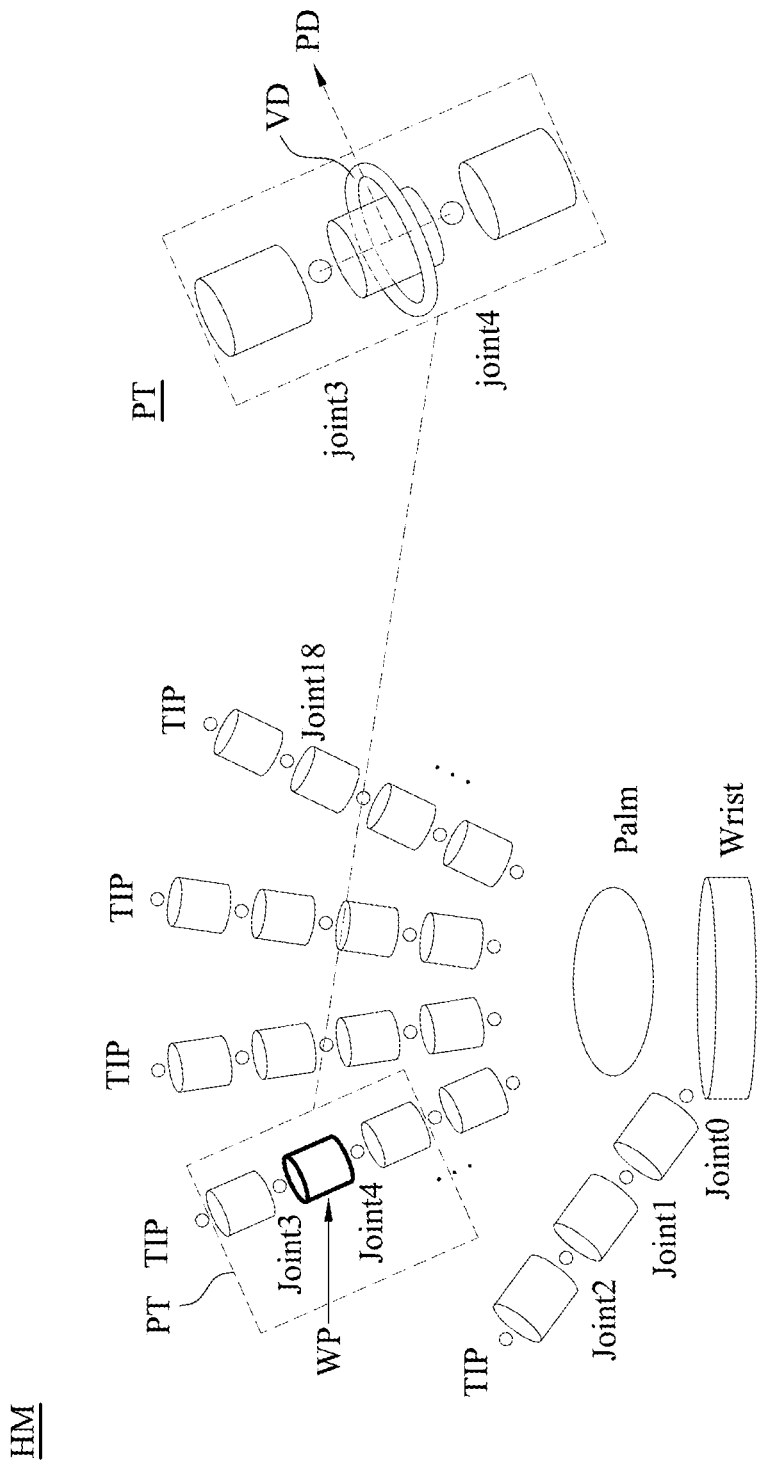
FIG. 5 is a schematic diagram illustrating setting a pointer direction according to an embodiment of the disclosure.

The following is a practical example to demonstrate setting an initial pointer direction. Reference is further made to FIG. 5, which is a schematic diagram illustrating setting the initial pointer direction PD according to an embodiment of the disclosure. As shown in FIG. 5, assuming that the wearing position WP is set as the second knuckle of the index finger of the user, the wearing position WP is between the joint joint3 and the joint joint4 in the hand model HM. In this time, the device position in the monitored field can be identified as a position between the joint joint3 and the joint joint4. For example, it can add a coordinate of the joint joint3 and a coordinate of the joint joint4 in the 3-axis space and divide by 2 to generate the coordinate of the device position.

A part PT of the hand can be zoomed in and viewed from the side of the hand model HM. The head-mounted display 120 can generate a virtual device VD which has a ring shape at the wearing position WP at the device position, and set the initial pointer direction PD as a direction of a radius of the virtual device VD pointing to the back of the knuckle between the joint joint3 and the joint joint4.

It should be noted that, in addition to the above-mentioned setting method of the initial pointer direction PD, a direction, which is perpendicular to the direction of the radius of the virtual device VD, passing through a center point of the virtual device VD can also be set as the initial pointer direction PD.

Further, the initial pointer direction can be changed as change of the device position and the device rotation, and a changed initial pointer direction can be set as the pointer direction.

As shown in FIG. 2A, in step S250, a ray is generated in a virtual reality field according to the pointer direction and the device position. In this way, a start point of the ray in the virtual reality field is at the device position, and a direction of the ray is the pointer direction. Accordingly, the user can point or select to a virtual object in the virtual reality field by using the ray in the virtual reality field. In some embodiments, the above-mentioned steps S230 to S250 are perform by the device tracking module 123.

Figure 2B:
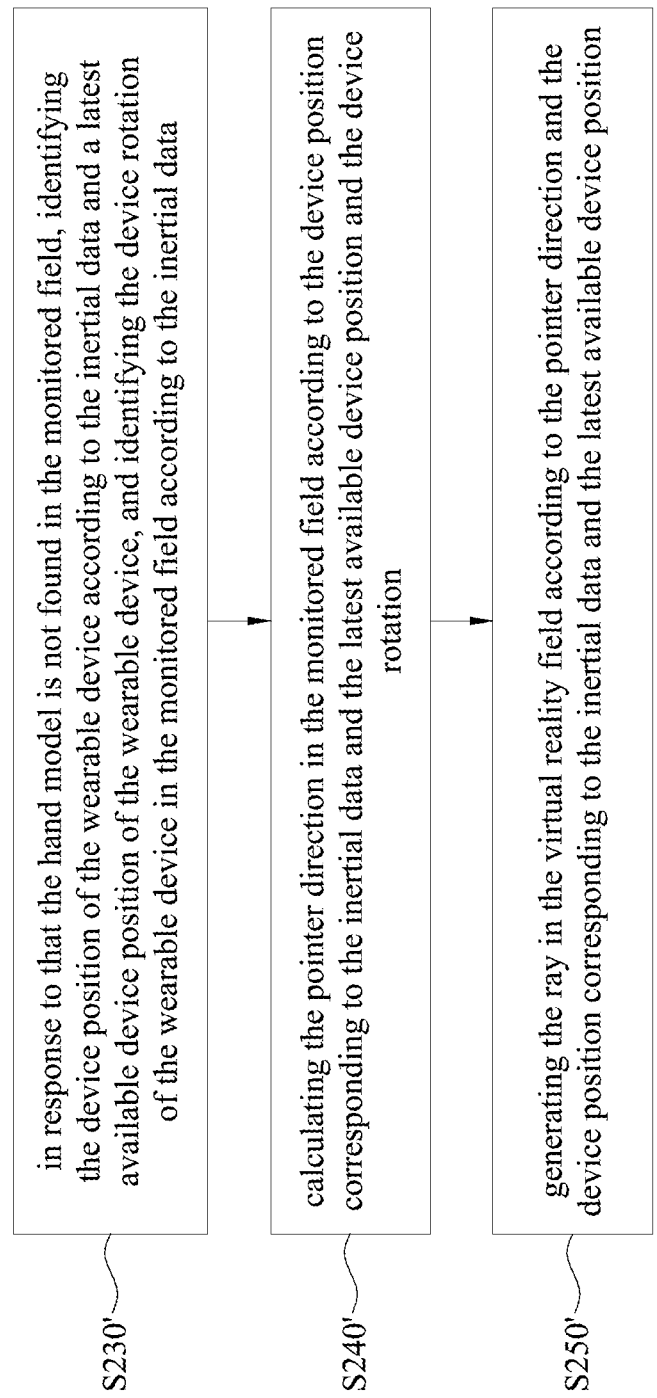
FIG. 2B is a flowchart of further steps in the motion computing method for mixed reality according to an embodiment of the disclosure.

The following will illustrate a situation where the hand model is not found in the monitored field. Reference is further made to FIG. 2B, which is a flowchart of further steps in the motion computing method for mixed reality according to an embodiment of the disclosure. The motion computing system 100 shown in FIG. 1 can be utilized to perform the further steps in the motion computing method shown in FIG. 2B.

As shown in FIG. 2B, firstly in step S230', in response to that the hand model is not found in the monitored field, the device position of the wearable device is identified according to the inertial data and a latest available device position of the wearable device, and the device rotation of the wearable device in the monitored field is identified according to the inertial data. Further, the latest available device position can be set by the user or the latest available device position can be identified from the hand model which is detected last times.

In step S240', the pointer direction in the monitored field is calculated according to the device rotation and the device position corresponding to the inertial data and the latest available device position. In step S250', the ray in the virtual reality field is generated according to the pointer direction and the device position corresponding to the inertial data and the latest available device position.

The following will continue to explain a situation of updating the hand model. Reference is further made to FIG. 2C, which is a flowchart of other further steps in the motion computing method for mixed reality according to an embodiment of the disclosure. The motion computing system 100 shown in FIG. 1 can be utilized to perform the other further steps in the motion computing method shown in FIG. 2C.

As shown in FIG. 2C, firstly in step S260, after generating the ray in the virtual reality field, the hand tracking algorithm for the hand in the monitored field is performed to determine whether a new hand model is found in the monitored field. In some embodiments, the monitored field is shot to generate a recent field image, and whether multiple joint data indicating multiple joints of the hand is found is determined. Next, in response to that the multiple joint data is found, the new hand model is generated according the multiple joint data.

In some embodiments, the image recognition algorithm for the recent field image is performed to determine whether the hand exists in the monitored field. Next, in response to that the hand exists in the monitored field, the multiple joint data indicating the multiple joints of the hand is identified, and the new hand model is generated according the multiple joint data.

In step S270, in response to that the new hand model for the hand of the user is found in the monitored field, the device position in the monitored field is updated according to the inertial data and the new hand model. In some embodiments, a detection frequency of the inertial data is more than a detection frequency of performing the hand tracking algorithm. In some embodiments, between generating the hand model and generating the new hand model, the device position of the wearable device in the monitored field is updated by integrating the inertial data. In some embodiments, each of the hand model and the new hand model includes the multiple joint data indicating the multiple joints of the hand.

In some embodiments, the device position of the wearable device in the monitored field is updated by integrating the inertial data from the first hand model.

In step S280, the device rotation of the wearable device in the monitored field is updated according to the inertial data. In some embodiments, the device position of the wearable device in the monitored field is updated by integrating the inertial data, and the device position is calibrated according to the new hand model.

In some embodiments, when the hand tracking succeeds, multiple displacements generated by integrating the inertial data can be calibrated by the new hand model to generate the device position of the wearable device in the monitored field. In some embodiments, when the hand tracking succeeds, the multiple displacements generated by integrating the inertial data can be calibrated by the new hand model through an Error-State Kalman filter (ESKF) (a practical example shown below). In some embodiments, at one of the detection time points of performing the hand tracking, a device position generated by the inertial data and a device position generated by performing the hand tracking can be fused by using the ESKF when a position difference between the device position generated by the inertial data and the device position generated by performing the hand tracking is more than a difference threshold.

In step S290', the pointer direction in the monitored field is updated according to the device position and an updated device rotation, and the ray in the virtual reality field is generated according to the pointer direction and the device position.

Figure 2D:
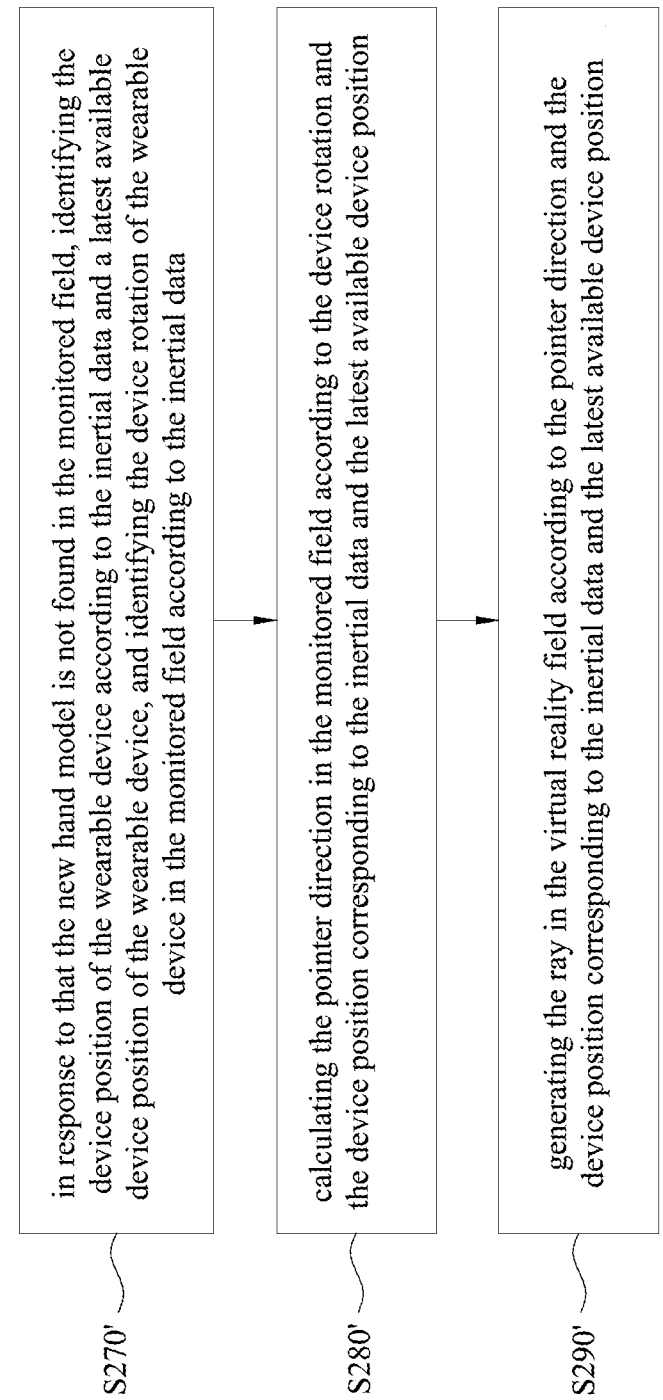
FIG. 2D is a flowchart of other further steps in the motion computing method for mixed reality according to an embodiment of the disclosure.

The following will illustrate a situation where the new hand model is not found in the monitored field. Reference is further made to FIG. 2D, which is a flowchart of other further steps in the motion computing method for mixed reality according to an embodiment of the disclosure. The motion computing system 100 shown in FIG. 1 can be utilized to perform the other further steps in the motion computing method shown in FIG. 2D.

As shown in FIG. 2D, firstly in step S270', in response to that the new hand model is not found in the monitored field, the device position of the wearable device is identified according to the inertial data and a latest available device position of the wearable device, and the device rotation of the wearable device in the monitored field is identified according to the inertial data.

In some embodiments, multiple displacements also can be generated by integrating the inertial data to generate the device position of the wearable device in the monitored field. In some embodiments, the device position of the wearable device in the monitored field can be calculated by combining the multiple displacements and the latest available device position.

In step S280', the pointer direction in the monitored field is calculated according to the device rotation and the device position corresponding to the inertial data and the latest available device position. In step S290', the ray in the virtual reality field is generated according to the pointer direction and the device position corresponding to the inertial data and the latest available device position.

Figure 6:
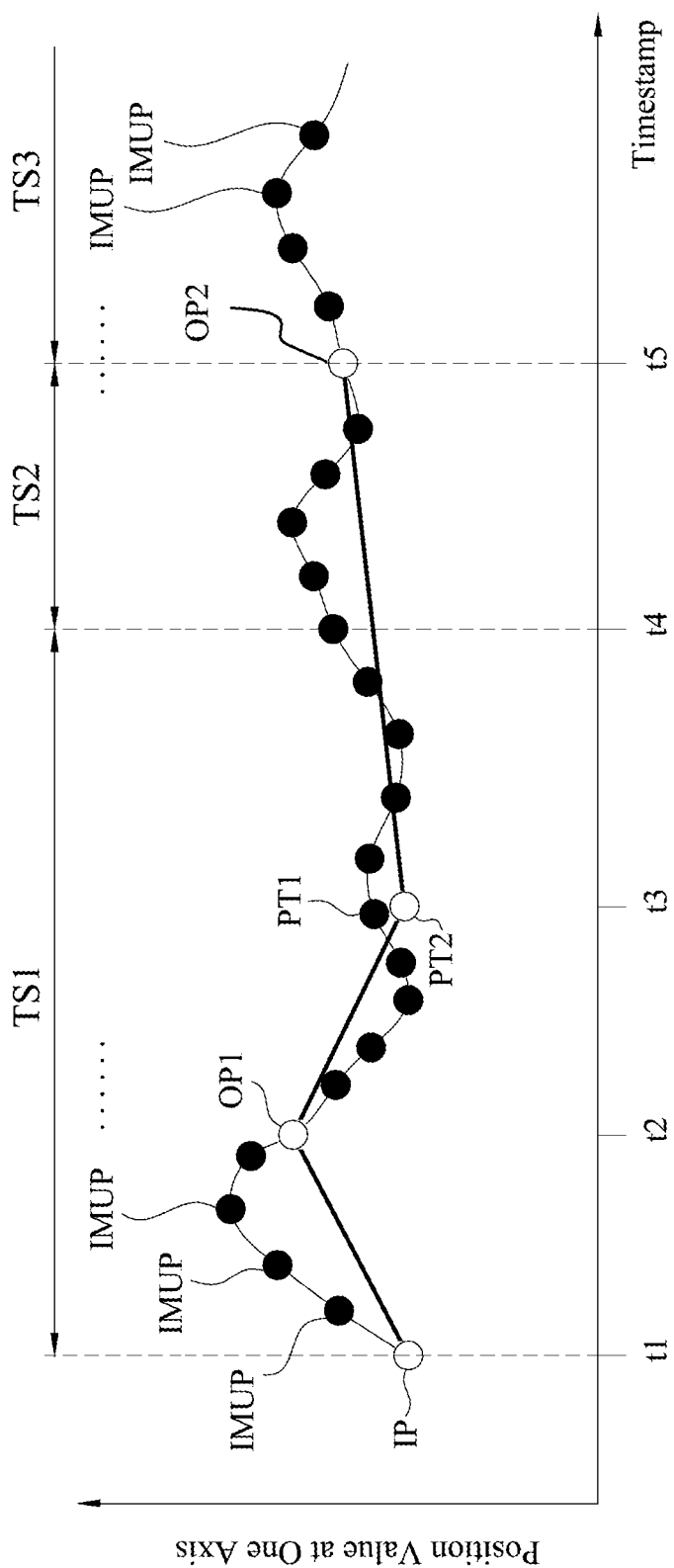
FIG. 6 is a schematic diagram illustrating one axis of position value according to an embodiment of the disclosure.

The following is a practical example to demonstrate generating the device position. Reference is further made to FIG. 6, which is a schematic diagram illustrating a position value at one axis according to an embodiment of the disclosure. As shown in FIG. 6, the device position is shown in the position value at one axis (e.g., x axis).

In a time sequence TS1, at a first detection time point t1, assuming that the hand model is found and generated, and the detection frequency of the inertial measurement unit 111 is over 200 Hz and the detection frequency of performing the hand tracking algorithm is 30 Hz, the device position is initialized according to the hand model. Based on this device position IP of the first detection time point t1, multiple displacement amounts can be generate by integrating the inertial data into a normal state between the first detection time point t1 and a second detection time point t2, and multiple device position IMUP can be generate according to the multiple displacement amounts. The following equation (1) and equation (2) show the normal state and an error state respectively.

$$X = \begin{bmatrix} p \\ v \\ q \\ a_b \\ w_b \\ g \end{bmatrix} \qquad \text{equation (1)}$$

$$\delta X = \begin{bmatrix} \delta p \\ \delta v \\ \delta \theta \\ \delta a_b \\ \delta w_b \\ \delta g \end{bmatrix} \qquad \text{equation (2)}$$

As shown in the above-mentioned equation (1), X is the normal state, p is the device position of the wearable device, v is velocity of the wearable device, q is rotation (i.e., quaternion) of the wearable device, $a_b$ is accelerometer bias of the wearable device, $w_b$ is gyroscope bias of the wearable device, and g is gravity vector of the wearable device. In other words, the normal state is consisted of position, velocity, rotation, accelerometer bias, gyroscope bias and gravity vector of the wearable device. That all estimated by measurement data of inertial sensor.

it should be noted that the normal state does not take into account the noise and other model imperfections. As a consequence, it will accumulate errors, which collected in the error state and with a Gaussian estimate by ESKF predicted.

As shown in the above-mentioned equation (2), $\delta X$ is the error state, $\delta p$ is the error of the device position of the wearable device, $\delta v$ is the error of velocity of the wearable device, $\delta \theta$ is the error of angle (i.e., angles vector) of the wearable device, $\delta a_b$ is the error of accelerometer bias of the wearable device, $\delta w_b$ is the error of gyroscope bias of the wearable device, and $\delta g$ is the error of gravity vector of the wearable device. In other words, the error state is consisted of the error of position, velocity, angle, accelerometer bias, gyroscope bias and gravity vector of the wearable device.

In the time sequence TS1, at the second detection time point t2, a displacement amount can be generated by integrating the inertial data. In this time, the device position IMUP can be generated from this displacement amount. In addition, another device position OP1 can be generated according to the new hand model. The information from other sensor (i.e., the new hand model) than the inertial measurement unit 111 is a true state. And a position error (i.e., position difference) between the device position IMUP and another device position OP1 can updated and corrected the ESKF and help to reset the error state. The following equation (3) shows the true state.

$$X_t = X \oplus \delta X \qquad \text{equation (3)}$$

As shown in the above-mentioned equation (3), Xt is the true state, and $\oplus$ indicates a generic composition.

In the time sequence TS1, at t a third detection time point t3, the position difference between the device position PT1 and another device position PT2 can be input to the ESKF to estimate again (i.e., fusing the device position PT1 and another device position PT2) an optimal device position as the device position at the third detection time. In another example, the device position PT1 also can be calibrated as another device position PT2 directly.

At a fourth detection time point t4, if the hand model cannot be found and generated, the device position IMUP can be updated by integrating the inertial data, normal state only in a time sequence TS2. At a fifth detection time point t5, in a time sequence TS3, if the hand model can be found and generated again, a displacement amount can be generated by integrating the inertial data. In this time, the device position IMUP can be calculated from this displacement amount. In addition, another device position OP1 can be calculated according to the new hand model. And the ESKF can be updated again by the position difference of the device position of the inertial measurement unit 111 and another device position OP1 of the hand model.

Figure 7:
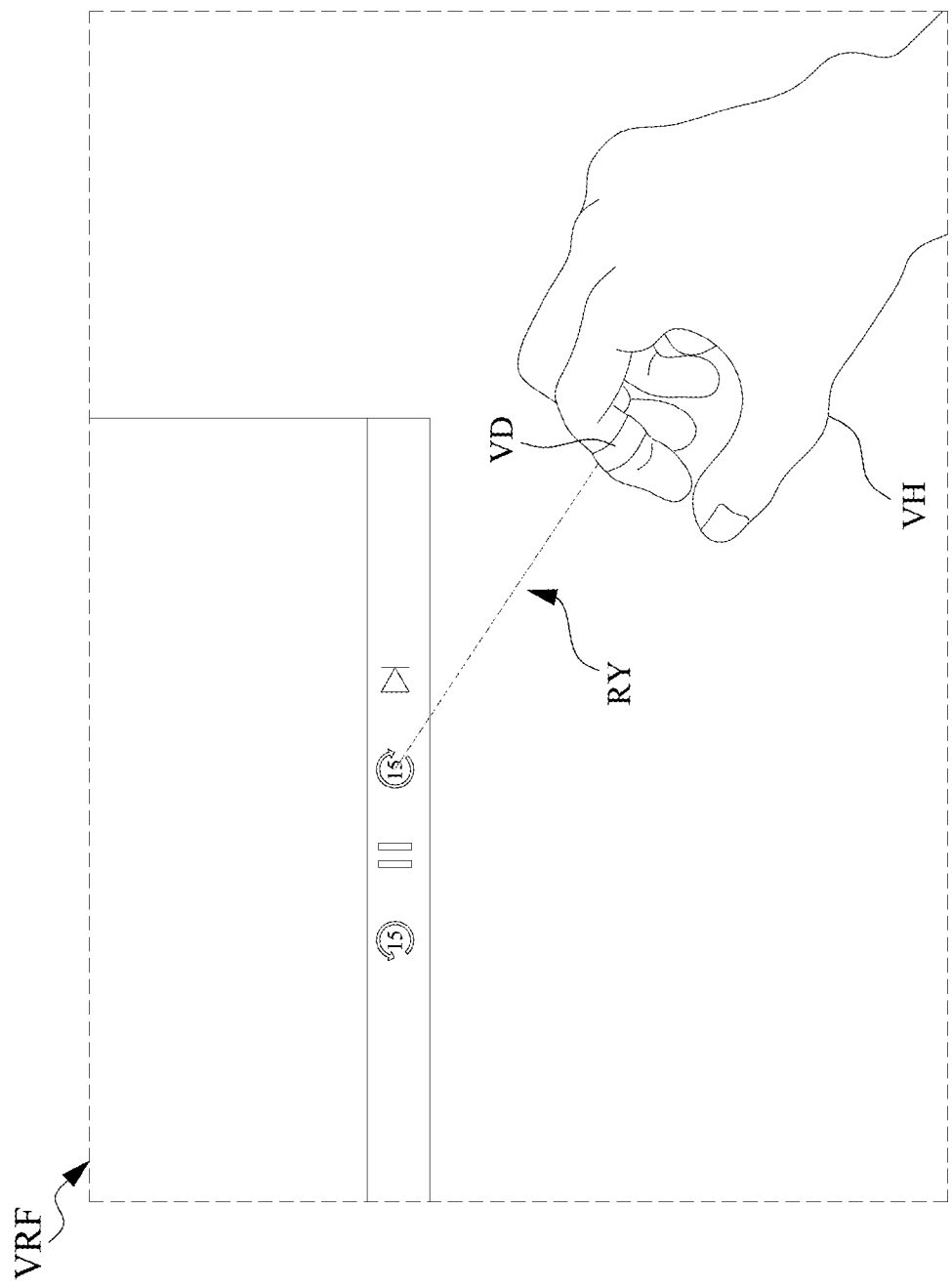
FIG. 7 is a schematic diagram illustrating generating a ray in a virtual reality field according to an embodiment of the disclosure.

The following is a practical example to demonstrate generating the ray in the virtual reality field. Reference is further made to FIG. 7, which is a schematic diagram illustrating generating the ray RY in the virtual reality field VRF according to an embodiment of the disclosure. As shown in FIG. 7, the head-mounted display 120 displays the virtual reality field VRF and a virtual hand VH (i.e., also generated by the hand tracking algorithm), and the virtual device VD is at the device position. The start point of the ray RY in the virtual reality field VRF is at the device position, and the direction of the ray RY is the pointer direction. The user can point to the virtual object (e.g., the Fast forward button in the virtual reality field VRF) in the virtual reality field VRF by the ray. In addition, the user can interact with the virtual objects by other finger which does not wear the wearable device 110 of the user in the virtual reality field VRF.

In summary, the motion computing system for mixed reality of the embodiments of the present disclosure can combine the wearable device and the head-mounted display to position the device position and the device rotation of the wearable device by using the hand model and the inertial data. In this way, this will greatly improve the accuracy of interactive input because the drift error of the inertial measurement unit or the dead zone error of the head-mounted display can be eliminated. In addition, it lets the user hand-free to interact by the hand of the user in the virtual reality field.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A motion computing system for mixed reality, comprising:
   a wearable device, comprising an inertial measurement unit, wherein the inertial measurement unit detects inertial data; and
   a head-mounted display, coupled to the wearable device, wherein the head-mounted display is configured to perform following steps for:
      setting a wearing position of the wearable device, wherein the wearing position indicates a position where the wearable device is worn on a hand of a user;
      determining whether a hand model having finger skeleton data for the hand of the user is found in a monitored field by a hand tracking algorithm;
      in response to that the hand model is found in the monitored field, identifying a device position of the wearable device according to the wearing position and the finger skeleton data, and identifying a device rotation of the wearable device in the monitored field according to the inertial data;
      calculating a pointer direction in the monitored field according to the device position and the device rotation; and
      generating a ray in a virtual reality field according to the pointer direction and the device position.

2. The motion computing system for mixed reality of claim 1, wherein the head-mounted display is further configured to perform following steps for:
   in response to that the hand model is not found in the monitored field, identifying the device position of the wearable device according to the inertial data and a latest available device position of the wearable device, and identifying the device rotation of the wearable device in the monitored field according to the inertial data;
   calculating the pointer direction in the monitored field according to the device rotation and the device position corresponding to the inertial data and the latest available device position; and
   generating the ray in the virtual reality field according to the pointer direction and the device position corresponding to the inertial data and the latest available device position.

3. The motion computing system for mixed reality of claim 1, wherein the head-mounted display is further configured to perform following steps for:
   after generating the ray in the virtual reality field, performing the hand tracking algorithm for the hand in the monitored field to determine whether a new hand model is found in the monitored field;
   in response to that the new hand model for the hand of the user is found in the monitored field, updating the device position in the monitored field according to the inertial data and the new hand model;
   updating the device rotation of the wearable device in the monitored field according to the inertial data; and
   updating the pointer direction in the monitored field according to the device position and an updated device rotation, and generating the ray in the virtual reality field according to the pointer direction and the device position.

4. The motion computing system for mixed reality of claim 3, wherein the step of performing the hand tracking algorithm for the hand in the monitored field to determine whether the new hand model is found in the monitored field comprises:
   shooting the monitored field to generate a recent field image, and determining whether a plurality of joint data indicating a plurality of joints of the hand is found; and
   in response to that the plurality of joint data is found, generating the new hand model according the plurality of joint data.

5. The motion computing system for mixed reality of claim 4, wherein the step of performing the hand tracking algorithm for the hand in the monitored field to determine whether the new hand model is found in the monitored field further comprises:

performing a image recognition algorithm for the recent field image to determine whether the hand exists in the monitored field; and in response to that the hand exists in the monitored field, identifying the plurality of joint data indicating the plurality of joints of the hand, and generating the new hand model according the plurality of joint data.

6. The motion computing system for mixed reality of claim 3, wherein a detection frequency of the inertial data is more than a detection frequency of performing the hand tracking algorithm, wherein the head-mounted display is further configured to perform a following step for:

between generating the hand model and generating the new hand model, updating the device position of the wearable device in the monitored field by integrating the inertial data.

7. The motion computing system for mixed reality of claim 3, wherein the step of updating the device position in the monitored field according to the inertial data and the new hand model comprises:

updating the device position of the wearable device in the monitored field by integrating the inertial data, and calibrating the device position according to the new hand model.

8. The motion computing system for mixed reality of claim 3, wherein the head-mounted display is further configured to perform following steps for:

in response to that the new hand model is not found in the monitored field, identifying the device position of the wearable device according to the inertial data and a latest available device position of the wearable device, and identifying the device rotation of the wearable device in the monitored field according to the inertial data;

calculating the pointer direction in the monitored field according to the device rotation and the device position corresponding to the inertial data and the latest available device position; and generating the ray in the virtual reality field according to the pointer direction and the device position corresponding to the inertial data and the latest available device position.

9. The motion computing system for mixed reality of claim 3, wherein each of the hand model and the new hand model comprises a plurality of joint data indicating a plurality of joints of the hand.

10. The motion computing system for mixed reality of claim 1, wherein the step of setting the wearing position of the wearable device comprises:

setting the wearing position of the wearable device as one of knuckles of the hand.

11. A motion computing method for mixed reality, comprising:

detecting inertial data, and setting a wearing position of a wearable device, wherein the wearing position indicates a position where the wearable device is worn on a hand of a user;

determining whether a hand model having finger skeleton data for the hand of the user is found in a monitored field by a hand tracking algorithm;

in respond to that the hand model in the monitored field, identifying a device position of the wearable device according to the wearing position and the finger skeleton data, and identifying a device rotation of the wearable device in the monitored field according to the inertial data;

calculating a pointer direction in the monitored field according to the device position and the device rotation; and generating a ray in a virtual reality field according to the pointer direction and the device position.

12. The motion computing method for mixed reality of claim 11, wherein the motion computing method further comprises:

in response to that the hand model is not found in the monitored field, identifying the device position of the wearable device according to the inertial data and a latest available device position of the wearable device, and identifying the device rotation of the wearable device in the monitored field according to the inertial data;

calculating the pointer direction in the monitored field according to the device rotation and the device position corresponding to the inertial data and the latest available device position; and generating the ray in the virtual reality field according to the pointer direction and the device position corresponding to the inertial data and the latest available device position.

13. The motion computing method for mixed reality of claim 11, wherein the motion computing method further comprises:

after generating the ray in the virtual reality field, performing the hand tracking algorithm for the hand in the monitored field to determine whether a new hand model is found in the monitored field;

in response to that the new hand model for the hand of the user is found in the monitored field, updating the device position in the monitored field according to the inertial data and the new hand model;

updating the device rotation of the wearable device in the monitored field according to the inertial data; and updating the pointer direction in the monitored field according to the device position and an updated device rotation, and generating the ray in the virtual reality field according to the pointer direction and the device position.

14. The motion computing method for mixed reality of claim 13, wherein the step of performing the hand tracking algorithm for the hand in the monitored field to determine whether the new hand model is found in the monitored field comprises:

shooting the monitored field to generate a recent field image, and determining whether a plurality of joint data indicating a plurality of joints of the hand is found; and in response to that the plurality of joint data is found, generating the new hand model according the plurality of joint data.

15. The motion computing method for mixed reality of claim 14, wherein the step of performing the hand tracking algorithm for the hand in the monitored field to determine whether the new hand model is found in the monitored field further comprises:

performing a image recognition algorithm for the recent field image to determine whether the hand exists in the monitored field; and in response to that the hand exists in the monitored field, identifying the plurality of joint data indicating the plurality of joints of the hand, and generating the new hand model according the plurality of joint data.

16. The motion computing method for mixed reality of claim 13, wherein a detection frequency of the inertial data is more than a detection frequency of performing the hand tracking algorithm, wherein the motion computing method further comprises:

between generating the hand model and generating the new hand model, updating the device position of the wearable device in the monitored field by integrating the inertial data.

17. The motion computing method for mixed reality of claim 13, wherein the step of updating the device position in the monitored field according to the inertial data and the new hand model comprises:

updating the device position of the wearable device in the monitored field by integrating the inertial data, and calibrating the device position according to the new hand model.

18. The motion computing method for mixed reality of claim 13, wherein the motion computing method further comprises:

in response to that the new hand model is not found in the monitored field, identifying the device position of the wearable device according to the inertial data and a latest available device position of the wearable device, and identifying the device rotation of the wearable device in the monitored field according to the inertial data;

calculating the pointer direction in the monitored field according to the device rotation and the device position corresponding to the inertial data and the latest available device position; and generating the ray in the virtual reality field according to the pointer direction and the device position corresponding to the inertial data and the latest available device position.

19. The motion computing method for mixed reality of claim 13, wherein each of the hand model and the new hand model comprises a plurality of joint data indicating a plurality of joints of the hand.

20. The motion computing method for mixed reality of claim 11, wherein the step of setting the wearing position of the wearable device comprises:

setting the wearing position of the wearable device as one of knuckles of the hand.

\* \* \* \* \*